Dec. 18, 1962  J. W. KRONLAGE ET AL  3,069,633
BLOCKING OSCILLATION CIRCUIT
Filed Jan. 12, 1960

WITNESSES:
Leon M. Garman
James F. Young

INVENTORS
John W. Kronlage and
Peter G. Bartlett.
BY Maury I. Hull
ATTORNEY

United States Patent Office 3,069,633
Patented Dec. 18, 1962

3,069,633
BLOCKING OSCILLATION CIRCUIT
John W. Kronlage, Linthicum, Md., and Peter G. Bartlett, Elmhurst, Ill., assignors to Westinghouse Electric Corporation, East Pittsburgh, Pa., a corporation of Pennsylvania
Filed Jan. 12, 1960, Ser. No. 2,032
9 Claims. (Cl. 331—112)

This invention relates to improvements in blocking oscillators, and more particularly to blocking oscillators employing transistors.

In prior art oscillator circuits for the generation of timing waveforms a number of techniques exist for the determination of pulse widths and pulse rate frequencies. Some prior art circuits employ R-C time constants, others employ L-R time constants, and still others employ the period of an L-C circuit. Of these, the first two mentioned are voltage dependent and therefore are characterized by instability and unreliability except under precise operating conditions.

The method utilizing the period of an L-C circuit is made to yield superior stability by employing a fairly high Q resonant circuit in which energy is replenished at such a rate that the effect of damping is unappreciable, and the apparatus of the instant invention utilizes the period of an L-C circuit for a timing purpose.

In summary, the circuit of the instant invention provides a transistorized, L-C timed, free running blocking oscillator which exhibits extremely good stability under conditions of supply voltage variations and extreme temperature changes.

A primary object of the invention is to provide a new and improved blocking oscillator.

Another object is to provide a new and improved blocking oscillator employing a transistor.

Still another object is to provide a new and improved transistorized blocking oscillator utilizing the period of an L-C circuit for timing and which exhibits stability under conditions of supply voltage variation.

Figure 1:
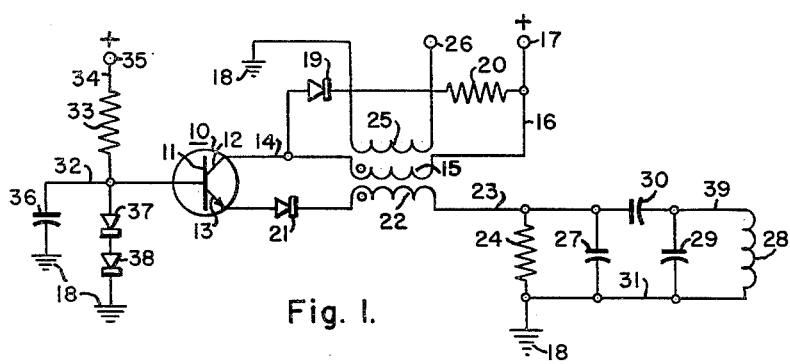
Figure 2:
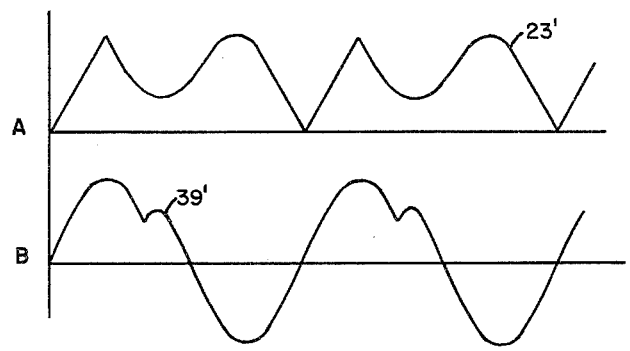

Other objects and advantages will become apparent after study of the following specification when read in connection with the accompanying drawings, in which:

FIGURE 1 is a schematic electrical circuit diagram of the invention according to the preferred embodiment thereof; and FIG. 2 is a graph illustrating the operation of the apparatus of FIG. 1.

In FIG. 1, to which particular reference is made, the reference numeral 10 generally designates a transistor having a base 11, collector 12 and emitter 13. The collector 12 is connected by way of lead 14, one winding 15 of a transformer, and lead 16 to the positive terminal 17 of a suitable source of direct current potential, not shown, having the other negative terminal thereof connected to ground 18. Winding 15 has the diode 19 and the resistor 20 connected in series thereacross. The aforementioned emitter 13 is connected by way of diode 21, transformer winding 22, lead 23, and resistor 24 to ground 18. The windings 15 and 22 comprise a transformer, and the turns ratio between the windings 15 and 22 may be 5 to 1, for example, winding 15 may have 40 turns and winding 22 may have 8 turns. The transformer including the windings 15 and 22 has a ferrite core, not shown. The transformer includes an additional output winding 25 having one end thereof connected to ground 18 and the other end thereof connected to an output terminal 26.

The aforementioned L-C circuit, the period of which times the operation of the blocking oscillator circuit, includes the inductor 28 and the capacitor 29 interconnected by leads 39 and 31. The inductor 28 and capacitor 29 in parallel with each other and forming the parallel resonant circuit are connected by way of a coupling network including capacitor 30 and capacitor 27 to the aforementioned resistor 24.

The aforementioned base 11 of transistor 10 is connected by way of lead 32, resistor 33 and lead 33 to the positive terminal 35 of a suitable source of direct current potential, not shown, having the other negative terminal thereof connected to ground 18. If desired, terminals 17 and 35 may be connected to the same direct current potential source. Lead 32 is further connected by way of capacitor 36 to ground 18, and lead 32 is also connected by way of a pair of series-connected diodes 37 and 38 to ground 18.

In the operation of the above described circuit of FIG. 1, inductor 28, capacitor 29, capacitor 30 and capacitor 27 make up a high Q power load resonant circuit, the resonant frequency of which is equal to the pulse repetition frequency to be established or provided by the apparatus. Across the resistor 24 there is provided a pulse source of low impedance which supplies energy to the resonant circuit on each cycle of operation; however, the resistor 24 does not load the L-C circuit 28—29 because of the coupling network interposed therebetween and including the capacitors 27 and 30. The resistor 24 may have, for example, a value of 1 kilohm, depending on the frequency which it is desired the circuit provide, one kilohm being suitable for a pulse repetition frequency of about 100 kilocycles.

It will be noted that the diodes 37 and 38 are poled in a direction so that current continually flows therethrough from the source of potential connected at terminal 35, resistor 33 dropping the voltage on lead 32. There is provided, then, a base biasing path for the base 11 of transistor 10. The two diodes 37 and 38 are used in the ground return path so that at lead 32 the bias current, in effect, looks into two diodes in each of the two possible paths it may take, the base-emitter path through transistor 10 in connection with diode 21 being considered one of the paths. This sets the transistor on the verge of conduction and aids in the maintenance of temperature stability; also, diodes 37 and 38 are used to overcome the starting voltage of the diode 21 and the diode equivalent path 13—11. Diode 21 also serves the purpose of preventing the back breakdown of the base-to-emitter portion of the transistor 10.

The synchronization of the output pulse with the resonant circuit sinusoid takes place as follows: Assume for purposes of description that the circuit is connected as shown and the supply voltages are turned on. Since the transistor is on the verge of conduction, any slight change in bias current will show up as a base current variation. This in turn will cause an amplified variation in the collector current. The transformer then, because of its phasing as indicated by the dots adjacent the windings thereof, initiates a regenerative action which culminates in the bottoming of the collector voltage, and a pulse, which may be a negative pulse, appears at the output. The resistor 24 simultaneously feeds a low impedance level pulse into the tank circuit capacitively coupled thereto, and divided by the capacitors 29—30—27 combination. The tank circuit is therefore made to ring at its natural frequency.

On the positive going cycle of this ringing the transistor 10 is cut off due to the reverse bias at the emitter 13. As the ringing thereafter goes in the negative direction, however, the transistor proceeds to conduct. This retriggers the pulse generating action on this and on all subsequent ringing cycles. The result is an output synchronized with the ringing cycle. This is evident from a study of the curves of FIG. 2, wherein the curve 23' of graph A represents the voltage or signal at lead 23, and the curve 39' of graph B represents the voltage at lead 39.

The aforementioned diode 21 protects the transistor 10 from damage which could otherwise occur on a large pulse overshoot at the emitter 13. The diode 19 controls the amplitude of the overshoot of the pulse at the collector 12 which is a natural result of "resetting," and prevents the occurrence of ringing in this branch of the circuit.

If desired, an output may be taken across the aforementioned resistor 24 and winding 25 dispensed with.

It will be understood that, for some types of transistors, one diode in the path 32—37—13 would be sufficient.

Whereas the invention has been shown and described with respect to the preferred embodiment thereof which gives satisfactory results, it should be understood that changes may be made and equivalents substituted without departing from the spirit and scope of the invention.

We claim as our invention:

1. A blocking oscillator circuit comprising, in combination, a transistor having a base, collector, and emitter, a transformer having at least a first winding and a second winding, circuit means including said first winding and a source of direct current energizing potential connecting said collector to a common circuit point, other circuit means including an additional source of direct current potential, resistor means, and diode means connected in series in the order named, a preselected point in said other circuit means being connected to said common circuit point, means connecting said base to the junction between said diode means and said resistor means for biasing the base at a predetermined voltage with respect to said common circuit point, a tuned circuit including a capacitor and an inductor and having a predetermined natural parallel resonant frequency, a coupling resistor, coupling means connecting said tuned circuit to said coupling resistor whereby current flowing through said coupling resistor applies an energizing potential to said tuned circuit through said coupling means, and further circuit means including said second winding and said coupling resistor connecting said emitter to said common circuit point, said first and second windings having a predetermined turns ratio whereby variations in the base current of the transistor cause an amplified variation in the collector current of said transistor, said variation in collector current as a result of said first and second transformer windings initiating a regenerative action culminating in the bottoming of the collector voltage and the generation of a pulse of predetermined polarity across said coupling resistor which energizes the tuned circuit and causes the tuned circuit to ring at its natural resonant frequency and develop an alternating current voltage therein, alternations of said last named voltage of a polarity opposite to said predetermined polarity applying a reverse bias to said emitter whereby said transistor does not conduct during said last named alternations and pulses of current through said transistor are produced at a repetition rate corresponding to said natural resonant frequency, the value of said coupling resistor and the Q of said tuned circuit being chosen with respect to each other whereby the energy in the tuned circuit is replenished at such a rate that no substantial damping of the voltage in said tuned circuit occurs.

2. Apparatus according to claim 1 including in addition an additional output winding for the transformer, and output circuit means connected to said additional winding.

3. A blocking oscillator circuit comprising, in combination, a transistor having a base, collector, and emitter, circuit means connected to said base for applying a predetermined biasing potential to said base with respect to a common circuit point, a transformer having first, second and third windings, a source of direct current potential, other circuit means connecting said source of direct current potential and said first winding in series between said collector and said common circuit point, a rectifier, a coupling resistor, further circuit means connecting said second winding, said rectifier and said coupling resistor in series between said emitter and said common circuit point, a parallel resonant circuit including an inductor and a capacitor and having a preselected parallel resonant frequency, means connecting said parallel resonant circuit to said coupling resistor to be energized by the voltage developed across said coupling resistor, the coupling between said first winding and said second winding providing for the generation of pulses in the transistor and through the second winding, the pulse repetition frequency being under the control of said parallel resonant circuit as the emitter of said transistor is alternately forward biased and reversed biased by alternations of the alternating current voltage developed in said resonant circuit, said resonant circuit having a predetermined Q, said Q and the value of said coupling resistor being selected with respect to each other whereby energy in the resonant circuit is replenished at such a rate that no substantial damping of the voltage therein occurs, and output circuit means connected to said third winding for obtaining an output pulse with respect to said common circuit point.

4. Apparatus according to claim 3 including in addition series connected rectifier means and resistor means operatively connected across said first winding for limiting the amplitude of pulse overshoots at said collector.

5. A blocking oscillator comprising, in combination, a transistor have a base, collector and emitter, circuit means including direct current biasing means connected to said base for biasing the base with respect to a common circuit point, transformer means including first and second windings, energizing means, other circuit means connecting said energizing means and said first winding to the collector in a manner whereby the collector current flows through said first winding to said common circuit point, said second winding having one end thereof operatively connected to said emitter, further circuit means including a parallel resonant circuit operatively connecting the other end of said second winding to said common point, said parallel resonant circuit having a predetermined value of Q and being energized in response to emitter current flowing in said further circuit means and developing an alternating current voltage therein at the resonant frequency, said first and second windings providing for the feedback of energy between said emitter and collector to provide for the generation of a recurring signal in said transistor, the repetition frequency of said signal being under the control of said parallel resonant circuit as the emitter of said transistor is alternately forward biased and reverse biased by alternations of the alternating current voltage developed in said resonant circuit, the component values of said resonant circuit and said further circuit means being preselected with respect to each other to provide an arrangement in which energy is replenished in the resonant circuit at a rate such that no substantial damping of the voltage in the resonant circuit occurs.

6. An oscillator according to claim 5 including in addition, means including a first diode operatively connected to said collector to limit signal overshoots thereat, and a second diode connected in series in the current path through said emitter and said further circuit means to limit signal overshoots at said emitter.

7. A blocking oscillator circuit comprising, in combination, a transistor having a base, collector, and emitter, means operatively connected to said base for applying a biasing potential to said base, a transformer having first and second windings, a source of direct current energizing potential, collector circuit means including the first winding and the source of energizing potential connected to said collector, rectifier overshoot limiting means connected across said first winding, a rectifier, a coupling resistor, emitter circuit means including said second winding, said rectifier, and said coupling resistor all connected in series, the windings of said transformer providing regenerative feedback between the collector circuit means and the emitter circuit means for producing a recurrent pulse signal, and resonant circuit means having a predetermined value of Q operatively connected to said coupling resistor and energized by signals developed across said coupling resistor, said resonant circuit means ringing at its natural resonant frequency and producing an alternating current voltage in the resonant circuit means, said alternating current voltage controlling the frequency of the signals produced by said transistor by reverse biasing the emitter of the transistor during alternations of one polarity and forward biasing the emitter of the transistor during alternations of the other polarity, said resonant circuit means and the value of said coupling resistor being selected with respect to each other whereby energy in the resonant circuit means is replenished at such a rate that no substantial damping of the voltage in the resonant circuit means occurs.

8. Apparatus according to claim 7 including in addition a third winding on the transformer, and output means connected to said third winding for providing a signal output.

9. A blocking oscillator comprising, in combination, first circuit means including a first resistor and first and second rectifiers connected in series, a source of direct current potential of predetermined polarity connected to said first circuit means for energizing the same, a transistor having a base, collector, and emitter, means connecting said base to a predetermined point in said first circuit means for biasing said base at a predetermined potential with respect to a common circuit point, second circuit means including said common circuit point, said second circuit means including an additional source of direct current energizing potential and a first transformer winding connected to said collector, an additional rectifier and a resistor connected in series across said first transformer winding, a second transformer winding coupled to said first transformer winding, a coupling resistor, a further rectifier, third circuit means connecting said further rectifier, said second winding and said coupling resistor in series between said emitter and said common circuit point, means forming a parallel resonant circuit having a predetermined value of Q, coupling means connecting said parallel resonant circuit to said coupling resistor whereby signals appearing across said coupling resistor energize said parallel resonant circuit and cause said circuit to ring at its natural resonant frequency and develop an alternating current voltage therein, the coupling between said first and second transformer windings providing for the generation of recurrent signals by said transistor at a time period under the control of said parallel resonant circuit, the Q of said resonant circuit and the value of the coupling means and coupling resistor being selected with respect to each other whereby energy in the resonant circuit is replenished at such a rate that no substantial damping of the voltage developed therein occurs, and a third transformer winding inductively coupled to said first winding for providing an output signal.

References Cited in the file of this patent

UNITED STATES PATENTS

| | | |
|---|---|---|
| 2,292,835 | Hepp | Aug. 11, 1942 |
| 2,848,613 | Green et al. | Aug. 19, 1958 |
| 2,906,893 | Mattson | Sept. 29, 1959 |